US010149222B2

(12) United States Patent
Sundberg et al.

(10) Patent No.: US 10,149,222 B2
(45) Date of Patent: Dec. 4, 2018

(54) WIRELESS DEVICE AND METHODS THEREIN FOR AN IMPROVED CELL RESELECTION PROCEDURE

(71) Applicant: Telefonaktiebolaget LM Ericsson (publ), Stockholm (SE)

(72) Inventors: Mårten Sundberg, Årsta (SE); Ulf Händel, Norsholm (SE); Olof Liberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/572,533

(22) PCT Filed: Mar. 31, 2017

(86) PCT No.: PCT/SE2017/050325
§ 371 (c)(1),
(2) Date: Nov. 8, 2017

(87) PCT Pub. No.: WO2017/184053
PCT Pub. Date: Oct. 26, 2017

(65) Prior Publication Data
US 2018/0176846 A1 Jun. 21, 2018

Related U.S. Application Data

(60) Provisional application No. 62/326,033, filed on Apr. 22, 2016.

(51) Int. Cl.
*H04W 36/00* (2009.01)
*H04W 36/30* (2009.01)
(Continued)

(52) U.S. Cl.
CPC ........... *H04W 36/30* (2013.01); *H04W 24/08* (2013.01); *H04W 36/0094* (2013.01); *H04W 52/0209* (2013.01)

(58) Field of Classification Search
CPC . H04W 24/08; H04W 36/0094; H04W 36/30; H04W 52/0209
(Continued)

(56) References Cited

U.S. PATENT DOCUMENTS

| 2014/0213254 | A1* | 7/2014 | Yang | H04W 36/14 455/436 |
| 2014/0315555 | A1 | 10/2014 | Zhang et al. | |
| 2018/0184344 | A1* | 6/2018 | Periyasamy | H04W 36/0083 |

FOREIGN PATENT DOCUMENTS

WO 2013147665 A1 10/2013

OTHER PUBLICATIONS

3GPP, "3rd Generation Partnership Project; Technical Specification Group GSM/EDGE Radio Access Network; Radio subsystem link control (Release 13)", 3GPP TS 45.008 V13.1.0, Feb. 2016, 1-161.

* cited by examiner

*Primary Examiner* — Charles Shedrick
(74) *Attorney, Agent, or Firm* — Murphy, Bilak & Homiller, PLLC

(57) ABSTRACT

A wireless device 204 and a method for providing an improved cell reselection procedure. The wireless device is served in a serving cell 212-1. At a first point in time, the wireless device determines a first signal quality of a first signal received from the serving cell. At a second point in time, it determines a second signal quality of a second signal received from a neighbor cell 212-2, 222, 232. Based on the determined first and second signal qualities, the wireless device determines a first trigger condition for performing measurements for cell reselection. At a third point in time, the wireless device determines a third signal quality of a third signal received from the serving cell. When a difference between the third and first signal qualities has passed the trigger condition, the wireless device performs at least (Continued)

one measurement for cell reselection on at least one of the cells.

23 Claims, 6 Drawing Sheets

(51) Int. Cl.
*H04W 24/08* (2009.01)
*H04W 52/02* (2009.01)

(58) Field of Classification Search
USPC .......................... 455/436–444; 370/331–332
See application file for complete search history.

Fig. 4 Method performed by the wireless device 240

WIRELESS DEVICE AND METHODS THEREIN FOR AN IMPROVED CELL RESELECTION PROCEDURE

TECHNICAL FIELD

Embodiments herein relate to a wireless device and methods therein. Especially, embodiments herein relate to an improved cell reselection procedure.

BACKGROUND

Communication devices such as terminals or wireless devices are also known as e.g. User Equipments (UEs), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. an "eNB", an "eNodeB", a "NodeB", a "B node", or a Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

The 3GPP LTE radio access standard has been written in order to support high bitrates and low latency both for uplink and downlink traffic. All data transmission is in LTE controlled by the radio base station.

In a wireless communications system, such as a cellular network, a wireless device, e.g. a mobile station, is periodically monitoring the surrounding radio environment, in order for the mobile station to be connected to the most suitable cell, e.g. to the most suitable radio base station serving the cell, or at least to a suitable cell. The selection of the suitable cell may be based on network decision or by autonomous mobile decision. It should be understood that the expression "the mobile station is connected to a cell" or similar is to be interpreted as the mobile station is connected to a radio network node, e.g. a radio base station or a similar device, that serves or provides radio coverage in a geographical area referred to as the cell. Further, it should be understood that sometimes herein reference is made to the cell and the radio network node serving the cell interchangeably. Thus, sometimes when a reference is made to the cell it should be interpreted as a reference to the radio network node serving the cell. However, it should be understood that several cells may be served by the same radio network node.

The initial process to select a cell by searching possible different alternatives is usually referred to as cell selection. The process of periodically monitoring cells and, after an initial cell selection, deciding to move to another cell based on the information acquired through monitoring is usually referred to as a cell reselection procedure.

For cell reselection the process typically involves monitoring different signal strengths from different cells, e.g. from different radio base stations or from different cells served by the same radio base station, and ordering them in descending order. That is, the stronger the signal strength from the cell is, the more suitable is the cell to camp on. In case all cells being monitored are weak in signal strength there is typically a minimum allowed signal strength for a cell to be considered as a suitable cell by the mobile station.

By the expression "camp on" when used in this disclosure is meant that the mobile station is served by the radio network node serving the cell the mobile station is camping on. Sometimes in this disclosure, the cell the mobile station is camping on is referred to as a serving cell. Further, sometimes herein the expressions "cell camped on" and "serving cell" are used interchangeably.

By frequently monitoring the surrounding radio environment the mobile station may be ensured to be camping on the cell serving the mobile station with the strongest signal strength, or at least one of the stronger cells, given its current position. In case the mobile station is moving around, the radio environment will change. Hence, to be fully up to date on the surrounding radio environment, the mobile station would have to frequently search for and monitor neighboring cells and to monitor the serving cell, in order to understand the changes over time. This procedure consumes energy, and it will more quickly drain the battery, the more frequently these search procedures are performed. That is a drawback for a mobile station that is dependent on a battery for power.

Although there are mobile stations that benefit from frequent cell-reselection procedures, there are other classes of mobile stations that rather trade a longer battery lifetime for a sub-optimum cell re-selection procedure. At the same time, it is always of interest for any mobile station to be connected to the best cell, e.g. to the cell having the highest signal strength, or at least to a good cell, e.g. to a cell having a high signal strength, to minimize interference levels in the communications network, and hence minimize transmission and/or reception times.

A possible change to the cell re-selection behavior is to allow the mobile station to stay camped on a specific cell as long as the cell is suitable, i.e. the minimum allowed signal strength is fulfilled. In other words, as long as the minimum signal strength is fulfilled, the mobile station would not search for other cells to camp on. However, this would imply that a significant degradation of signal strength of the camped cell would be allowed while still not triggering cell re-selection. If this occurs and better cells are available in the mobile station's current location this would imply increased interference levels in the communications network. Further, it would imply draining of battery during activity by the mobile station since a reduced experienced Signal-to-Interference-plus-Noise Ratio (SINR) would imply a longer ON time for the mobile station both for transmission and reception.

SUMMARY

According to developments of wireless communications networks an improved cell reselection procedure is needed for improving the performance of the wireless communications network in terms of providing a sustainable balance between radio network performance and device battery life.

Therefore, an object of embodiments herein is to overcome the above-mentioned drawbacks among others and to improve the performance in a wireless communications system. For example, an object of embodiments herein is to provide an improved cell reselection procedure.

According to a first aspect of embodiments herein, the object is achieved by a method performed by a wireless device for providing an improved cell reselection procedure. The wireless device is served in a first cell, e.g. a serving cell, by a first Radio Network Node (RNN). Further, the wireless device and the first RNN are operating in a wireless communications network.

At a first point in time T1, the wireless device determines a first signal quality of a first signal received from the serving cell. Further, at a second point in time T2, e.g. a second point in time T2 similar to the first point in time T1, the wireless device determines a second signal quality of a second signal received from a neighbour cell.

It should be understood that the first and second signal qualities are determined at the same time or almost at the same time, and thus they are determined at similar or corresponding points in time. In other words, the first and second points in time T1,T2 are equal or almost equal. Consequently, the first and second points in time T1, T2 may be the same point in time.

Based on the determined first and second signal qualities, the wireless device determines a trigger condition for performing measurements for cell reselection.

At a third point in time T3, the wireless device determines a third signal quality of a third signal received from the serving cell.

Further, when a difference between the third signal quality and the first signal quality has passed the trigger condition, the wireless device performs one or more measurements for cell reselection on one or more out of the serving cell and one or more neighbour cells.

Furthermore, the wireless device may perform cell reselection based on a result of the performed measurement for cell reselection.

According to a second aspect of embodiments herein, the object is achieved by a wireless device for providing an improved cell reselection procedure. The wireless device is configured to be served in a first cell, e.g. a serving cell, by a first Radio Network Node (RNN). Further, the wireless device and the first RNN are configured to operate in a wireless communications network.

The wireless device is configured to determine a first signal quality of a first signal received from the serving cell at a first point in time T1. Further, the wireless device is configured to determine a second signal quality of a second signal received from a neighbour cell at a second point in time T2, e.g. a second point in time T2 similar to the first point in time T1.

Further, the wireless device is configured to determine a trigger condition for performing measurements for cell reselection based on the determined first and second signal qualities.

Furthermore, the wireless device is configured to determine a third signal quality of a third signal received from the serving cell at a third point in time.

Yet further, the wireless device is configured to perform one or more measurements for cell reselection when a difference between the third signal quality and the first signal quality has passed the trigger condition.

The wireless device may be configured to perform cell reselection based on a result of the performed measurement for cell reselection on one or more out of the serving cell and one or more neighbour cells.

According to a third aspect of embodiments herein, the object is achieved by a computer program, comprising instructions which, when executed on at least one processor, causes the at least one processor to carry out the method performed by the wireless device.

According to a fourth aspect of embodiments herein, the object is achieved by a carrier comprising the computer program, wherein the carrier is one of an electronic signal, an optical signal, a radio signal or a computer readable storage medium.

Since the wireless device performs one or more measurements for cell reselection when the difference between the third signal quality and the first signal quality has passed the determined trigger condition, and since the wireless device performs cell reselection based on a result of the performed measurement for cell reselection, the cell reselection procedure is improved. This results in an improved performance in the wireless communications system.

An advantage with embodiments herein is that they enable the wireless device to be camped more frequently on the most suitable cell, e.g. the most suitable serving cell, than what is currently specified, while at the same time allowing for a substantial reduction in power consumption compared to the behaviour of legacy wireless devices for which measurements for cell reselection is triggered much more frequently.

A further advantage with embodiments herein is that by having the wireless device to camp on a suitable cell with limited need to perform neighbour cell measurements, the battery power of the wireless device will be saved since less power is needed to reach a serving radio network node, e.g. base station.

A further advantage with embodiments herein is that a reduced energy consumption is provided when the receiver and transmitter ON time is reduced. In the interest of battery conservation, a wireless device that is battery operated may search for and monitor neighbour cells on a limited basis as long as the current serving cell remains suitable.

The points in time where such a wireless device chooses to re-evaluate the suitability of its current serving cell may also serve as opportunities to determine if that serving cell is deteriorating to an excessive degree. If such a determination is made then the wireless device may begin searching for and monitoring neighbour cells and then perform cell reselection if a better cell is found.

Therefore, some embodiments herein identify a new reselection trigger condition that may help to reduce interference levels in the wireless network by lowering the wireless device's transmit time and to conserve the wireless device's battery by reducing the amount of energy consumed per transmission and/or reception event by reducing the wireless communications device's on time.

By the expression "transmit time" when used in this disclosure is meant a period of time during which the wireless device transmits information. Further, by the expression "ON time" when used in this disclosure is meant a period of time during which the wireless device receives and/or transmits information. The on time may sometimes be referred to as an active time. The additional energy consumed by the wireless device performing the additional processing required to evaluate serving cell deterioration is seen as being substantially less than the energy saved by reducing wireless device transmit "on time".

BRIEF DESCRIPTION OF DRAWINGS

Examples of embodiments herein will be described in more detail with reference to attached drawings in which.

DETAILED DESCRIPTION

As part of developing embodiments herein, some problems with the state of the art communications networks will first be identified and discussed.

In Extended GSM Coverage for Internet-of-Things (EC-GSM-IoT) feature, the current assumption is that a wireless device when determining if it has to perform measurements for cell reselection only triggers this under certain conditions. This is done in order to save battery in the wireless device. One important condition is that the signal strength of the cell the wireless device is camped on has not changed more than a certain threshold, see for example the 3GPP TS 45.008 v13.1.0 subclause 6.6.1a.

For example, in a first scenario, assume that a wireless device is camping on the strongest measured cell, and that the strongest neighbour cell is 3 dB weaker in signal strength. In a second scenario assume that the wireless device is camping on the strongest measured cell, and that the strongest neighbour cell is 20 dB weaker in signal strength. In these two scenarios, measurements for cell reselection should be triggered faster in the first scenario if a change in the camped cell's signal strength is detected, since this will indicate that the earlier measured neighbour cell might have become stronger, and might be the more suitable cell to camp on. With the current specification, e.g. the 3GPP TS 45.008 v.13.1.0, this is however not the case, and measurements for cell reselection is instead triggered based on a fixed relative change in measured signal strength of the camped cell, irrespective of the neighbouring radio environment.

A problem with this approach is that the wireless device will not adopt its cell reselection behaviour depending on the surrounding radio environment.

Figure 1:
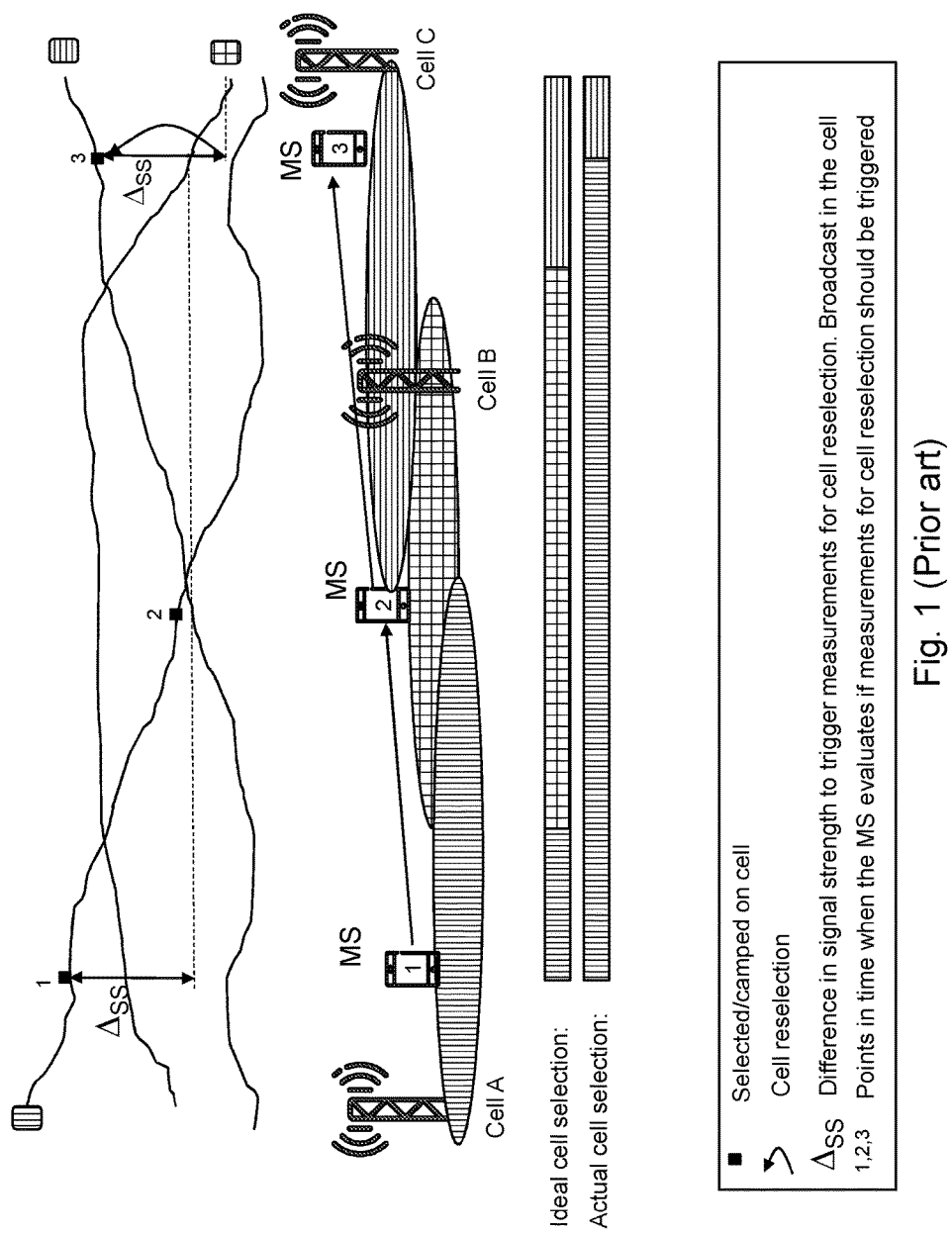
FIG. 1 is a schematic block diagram schematically illustrating cell reselection in a wireless communications system according to prior art.

FIG. 1 is a schematic block diagram schematically illustrating cell reselection in a wireless communications system according to prior art.

A Mobile Station (MS) first performs measurements at point 1 in time. The result is that a cell A is the strongest cell and hence the MS camps on that cell. A difference in signal strength between two measurements $\Delta_{SS}$ that triggers a cell reselection is or has been broadcasted to the MS.

Next, the MS wakes up at point 2 in location and time. It tries to confirm that the previously camped cell, e.g. the cell A, is still strong enough comparing to the strongest signal measured of the camped on cell, here the same as the one measured at point 1 in time. The Cell A is confirmed to be suitable since the signal strength change relative the measurement at point 1 is lower than the broadcasted threshold, e.g. the broadcasted $\Delta_{SS}$. Therefore, the MS continues to camp on cell A.

The MS wakes up at point 3 in time. It tries to confirm that the previously camped cell, e.g. the cell A, is still strong enough, but fails to confirm this since the change in signal strength relative to point 1 is higher, i.e. larger, than the broadcasted threshold, e.g. the broadcasted $\Delta_{SS}$. Measurements for cell reselection are triggered. It is found that cell C is the strongest cell and hence the MS camps on that cell. The same broadcasted threshold value, e.g. the broadcasted $\Delta_{SS}$, is used again as further trigger of measurements for further cell reselection.

It should be noted that the MS moves through cell B without ever selecting it, and this is despite the fact that cell B as illustrated in FIG. 1 would provide better signal strength than cell A.

An object addressed by embodiments herein is therefore how to provide an improved performance in a wireless communications system or a wireless communications network.

In order to overcome the above-mentioned drawbacks, some embodiments herein provides for an improved cell reselection procedure wherein a wireless device determines a first signal quality of a serving cell and determines a second signal quality of one or more neighbour cells, e.g. a strongest neighbour cell. Further, the wireless device determines a trigger condition for performing measurements for cell reselection based on the determined first and second signal qualities. Furthermore, the wireless device performs one or more measurements for cell reselection when a difference between a third signal quality and the first signal quality has passed the determined trigger condition. Yet further, the wireless device performs cell reselection based on a result of the performed measurement for cell reselection.

Some embodiments herein provide a balance between reduced requirements on monitoring and performing measurements for cell reselection to facilitate long device battery life and the requirements on selecting the most suitable cell at all times.

Terminology

The following terminology is used in embodiments described herein and is elaborated below:

Network node: In some embodiments a more general term "network node" is used and it may correspond to any type of radio network node or any network node, which communicates with a UE and/or with another network node.

Examples of network nodes are NodeB, MeNB, SeNB, a network node belonging to a Master Cell Group (MCG) or a Secondary Cell Group (SCG), Base Station (BS), Multi-Standard Radio (MSR) radio node such as MSR BS, eNodeB, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS), core network node (e.g. Mobile Switching Center (MSC), Mobility Management Entity (MME) etc.), Operations and Maintenance (O&M), Operations Support System (OSS), Self-organizing Network (SON), positioning node (e.g. Enhanced Serving Mobile Location Center (E-SMLC)), Mobile Data Terminal (MDT) etc.

User equipment/wireless device: In some embodiments the non-limiting terms wireless device, Mobile Station (MS) and User Equipment (UE) are used and they refer to any type of wireless device communicating with a network node and/or with another UE in a cellular or mobile communication system. Examples of UE/wireless device are Device-to-Device (D2D) UE, machine type UE or UE capable of Machine to Machine (M2M) communication, Personal Digital Assistant (PDA), Tablet, mobile terminals, smart phone, Laptop Embedded Equipped (LEE), Laptop Mounted Equipment (LME), Universal Serial Bus (USB) dongles etc. In this disclosure the terms wireless device and UE are used interchangeably.

General

Note that although terminology from Global System for Mobile Communications (GSM)/GSM EDGE Radio Access Network (GERAN) has been used in this disclosure to exemplify embodiments, this should not be seen as limiting the scope of embodiments herein to only the aforementioned system. Other wireless systems, including Wideband Code Division Multiple Access (WCDMA), High Speed Packet Access (HSPA), Worldwide Interoperability for Microwave Access (WiMax), WiFi, Wireless Local Area Network (WLAN), and 3GPP LTE, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel.

Further, the description frequently refers to wireless transmissions in the downlink, but embodiments herein are equally applicable in the uplink.

In the following section, embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 2:
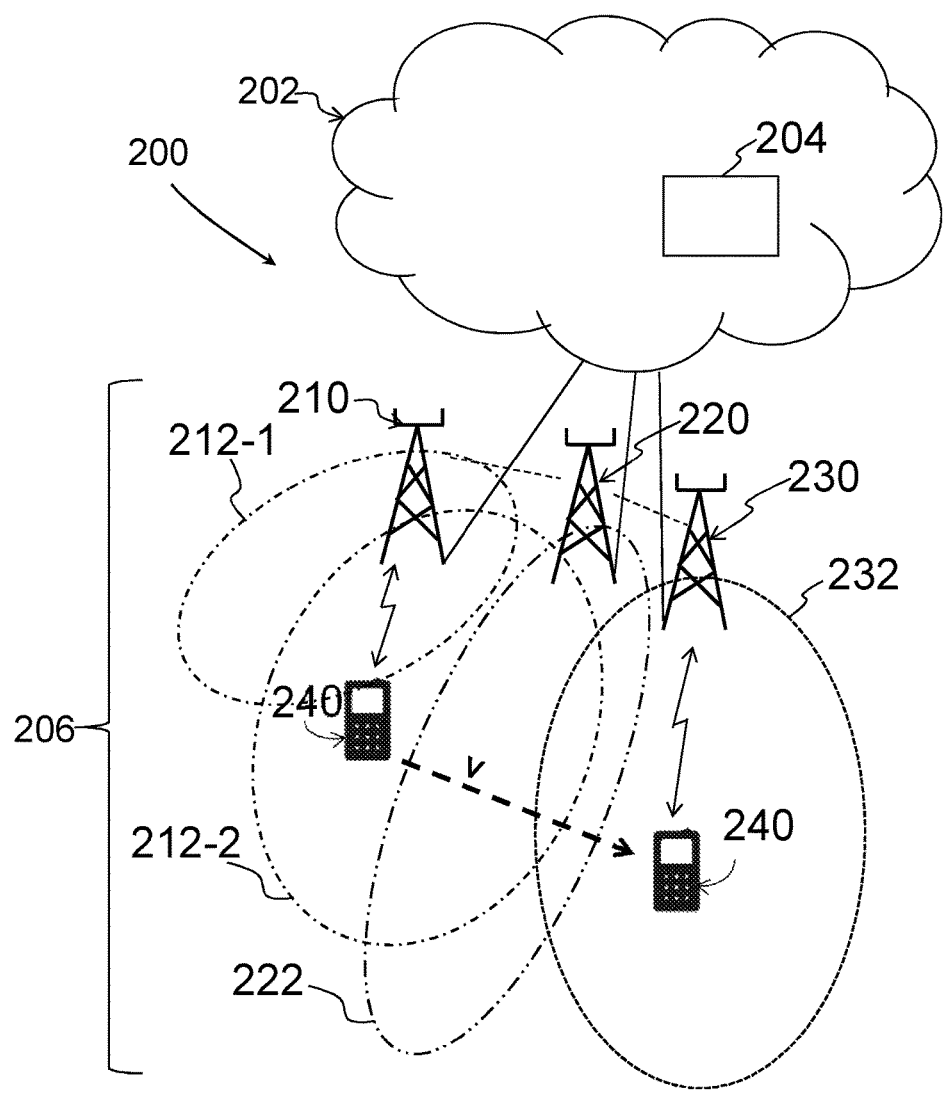
FIG. 2 schematically illustrates embodiments of a wireless communications system.

FIG. 2 depicts an example of the wireless communications system 200 in which embodiments herein may be implemented. The wireless communications system 200 is a wireless communication system such as a GERAN system, an LTE system, a WCDMA system, a GSM system, any 3GPP cellular system, WiMAX system, or any wireless or cellular network/system.

A core network 202 is comprised in the wireless communications system 200. The core network 202 is a wireless core network such as a GERAN core network, an LTE core network, e.g. a Evolved Packet Core (EPC); a WCDMA core network; a GSM core network; any 3GPP core network; WiMAX core network; or any wireless or cellular core network.

A core network node 204 is comprised in the core network 202. The core network node 204 may be an MSC, an MME, an O&M node, a Serving GateWay (S-GW), a Serving General Packet Radio Service (GPRS) Node (SGSN), etc.

A wireless communications network 206 is comprised in the wireless communications system 200. The wireless communications network 206 is a wireless communications network such as a GERAN network, an LTE communications network, e.g. an Evolved UMTS Terrestrial Radio Access Network (E-UTRAN); a WCDMA communications network; a GSM communications network; any 3GPP communications network; WiMAX communications network; or any wireless or cellular communications network.

It should be understood that in some embodiments the core network 202 and the wireless communications network 206 are combined into one single network or that the wireless communications network 206 may comprise the core network 202.

A first Radio Network Node (RNN) 210 serving a first geographical area, e.g. a first cell 212 such as a first serving cell, a second RNN 220 serving a second geographical area, e.g. a second cell 222 such as a second serving cell, and/or a third RNN 230 serving a third geographical area, e.g. a third cell 232 such as a third serving cell, may be operating in the wireless communications system 200. It should be understood that more than one RNN may be operating in the wireless communications system 200 and that one RNN may be configured to serve several geographical areas, e.g. cells. For example, as schematically illustrated in FIG. 2, the first RNN 210 may be configured to serve two first cells, e.g. a first first cell 212-1 and a second first cell 212-2. In this disclosure, the first first cell 212-1 is sometimes referred to as the serving cell 212-1. Further, in this disclosure, the second first cell 212-2, the second cell 222 and the third cell 232 are sometimes referred to as neighbouring cell 212-2, 222, 232.

As previously mentioned, the first RNN 210 is configured to operate in the wireless communications system 200. The second RNN 220 is configured to operate in the wireless communications system 200. Further, the third RNN 230 may be configured to operate in the wireless communications system 200. The RNNs 210, 220, 230 may each be a radio access node such as a radio base station, for example an eNB, an eNodeB, or a Home Node B, a Home eNode B or any other network node capable to serve a user equipment or a machine type communication device in a wireless communications network.

The RNNs 210, 220, 230 may each be configured for wireless communication with one or more wireless devices, such as the wireless device 240, when the wireless device is located within the geographical areas, e.g. the cells 212, 222, 232 served by the respective RNN 210, 220, 230. Herein, this is also specified as the respective RNN 210,220,230 manages or is configured to manage communication with one or more wireless devices in the respective geographical area. In this disclosure, the respective geographical area is sometimes referred to as a respective coverage area, cluster or cell. Further, when the wireless device is located within the geographical area and served by the RNN serving the geographical area, that geographical area may be referred to as a serving geographical area, e.g. a serving cell. Thus, when the wireless device 240 is located within the first geographical area and is served by the first RNN 210, the first geographical area is sometimes herein referred to as the serving cell.

A wireless device 240 is operating in the wireless communications system 200. The wireless device 240 also referred to as a user equipment or UE is located in the wireless communications system 200. The wireless device 240 may e.g. be a user equipment, a mobile terminal or a wireless terminal, a mobile phone, a computer such as e.g. a laptop, a Personal Digital Assistants (PDAs) or a tablet computer, with wireless capability, or any other radio network units capable to communicate over a radio link in a wireless communications network. It should be noted that the term user equipment used in this document also covers other wireless devices such as Machine to Machine (M2M) devices, even though they are not handled by any user.

As schematically illustrated in FIG. 2, the wireless device 240 may be moving with a velocity v in a direction indicated by the dotted arrow.

Figure 3:
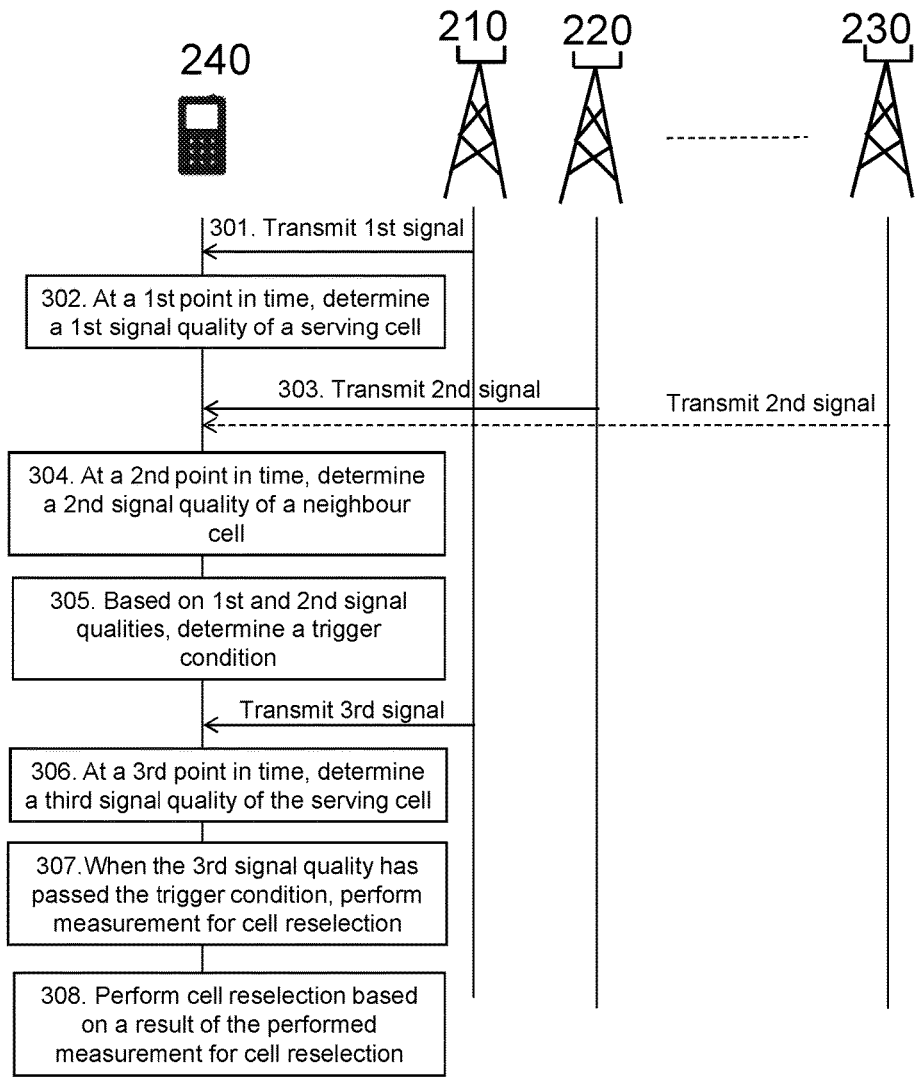
FIG. 3 is a combined flowchart and signalling scheme schematically illustrating embodiments of a method performed in a wireless communications network.

FIG. 3 is a combined flowchart and signalling scheme schematically illustrating embodiments of a method performed in a wireless communications network, such as the wireless communications network 206. The methods comprise one or more of the following actions. It should be understood that these actions may be taken in any suitable order and that some actions may be combined.

Action 301

A first signal is transmitted from a serving cell 212-1 to the wireless device 240. The serving cell 212-1 is served by a serving RNN, e.g. the first RNN 210. The first signal may be a GSM signal transmitted over an GSM air interface. However, the first signal may also be an NB-IoT signal, an LTE-M signal, or an LTE signal. LTE-M is the LTE feature and/or radio interface for machine to machine communication. Further, the first signal may be a broadcast signal, such as a signal transmitted on a broadcast channel, e.g. on a Broadcast Control Channel (BCCH) or on an Extended Coverage BCCH (EC-BCCH).

Action 302

At a first point in time T1, the wireless device 240 determines a first signal quality of the serving cell 212-1. For example, the wireless device 240 determines the first signal quality based on the first signal transmitted from the serving cell 212-1, as described in Action 301, and received by the wireless device 240. The signal quality may be a total signal strength, a Signal-to-Interference-plus-Noise Ratio (SINR), or carrier signal strength just to give some examples. For example, the wireless device 240 may determine the signal quality by measuring the energy in the total received signal.

The total signal strength may sometimes herein be referred to as useful signal strength or wanted signal strength and it may exclude noise and interference.

Action 303

A second signal is transmitted from a neighbouring cell 212-2, 222, 232 to the wireless device 240. The neighbouring cell 212-2, 222, 232 may be served by the first RNN 210, or by a neighbouring RNN, e.g. the second RNN 220 or the third RNN 230.

Further, one or more further second signals may be transmitted from one or more further neighbouring cells. The one or more neighbouring cells may be served by the first RNN 210, or by one or more neighbouring RNNs, e.g. the second RNN 220 or the third RNN 230.

It should be understood that the second signal transmitted from one of the neighbouring cell 212-2, 222, 232 may be different from another second signal transmitted from another neighbouring cell 212-2, 222, 232. Thus, two second signals transmitted from two different neighbouring cell 212-2, 222, 232 may be two distinct and different second signals.

The one or more second signals may be GSM signals transmitted over an GSM air interface. However, the one or more second signals may also be an NB-IoT signal, an LTE-M signal, or an LTE signal. Further, the second signal may be a broadcast signal, such as a signal transmitted on the broadcast channel e.g. on the BCCH or on the EC-BCCH.

Action 304

At a second point in time T2, the wireless device 240 determines one or more second signal qualities of the one or more neighbouring cells 212-2, 222, 232. For example, the wireless device 240 determines the one or more second signal qualities based on one or more second signals transmitted from the one or more neighbouring cells 212-2, 222, 232 and received by the wireless device 240. The neighbouring cells may be ranked in strength and the second signal quality may be signal quality of the strongest neighbour cell. As mentioned above, the signal quality may be a signal strength, a SINR, or carrier signal strength just to give some examples. For example, the wireless device 240 may determine the signal quality by measuring the energy in the total received signal. Further, as previously mentioned, it should be understood that the first and second signal qualities are determined at the same time or almost at the same time, and thus they are determined at similar or corresponding points in time. In other words, the first and second points in time T1,T2 are equal or almost equal. Consequently, the first and second points in time may be the same point in time or almost the same point in time, e.g. T1=T2 or T1≈T2. Further, it should be understood that the first point in time may precede the second point in time, or that the second point in time may precede the first point in time.

Sometimes in this disclosure the first and second points in time T1, T2 are referred to as a first point in time $T_A$.

Action 305

The wireless device 240 determines a trigger condition for performing measurements for cell reselection. The determination may be based on the determined first and second signal qualities. For example, the trigger condition may be a difference $\Delta_{SS}$ between the first and second signal qualities, a fraction of the difference $\Delta_{SS}$ between the first and second signal qualities, or a difference $\Delta_{SS}$ between the first and second signal qualities limited by a maximum and/or minimum value.

Action 306

At a third point in time T3, the wireless device 240 determines a third signal quality of the serving cell 212-1. For example, the wireless device 240 determines the third signal quality based on a third signal transmitted from the serving cell 212-1 and received by the wireless device 240. The third signal may be a GSM signal transmitted over an GSM air interface. However, the third signal may also be a an NB-IoT signal, an LTE-M signal, or an LTE signal. Further, the third signal may be a broadcast signal, such as a signal transmitted on the BCCH or the EC-BCCH.

As previously mentioned, the first signal may be transmitted by the serving cell 212-1 on a broadcast channel. Thus, it should be understood that the first and third signals transmitted by the serving cell 212-1 may be the same signal transmitted on the broadcast channel at two different points in time, e.g. the first point in time and the third point in time, respectively.

The third point in time T3 is different from the first and second points in time, e.g. T3>T1,T2. For example, the third point in time T3 may correspond to the time it takes for the wireless device 240 to travel from a first point A to a second point B.

Sometimes in this disclosure the third point in time T3 are referred to as a second point in time $T_B$.

Action 307

The wireless device 240 performs one or more measurements for cell reselection when the third signal quality has passed the trigger condition. In other words, the wireless device 240 performs the one or more measurements for cell reselection on one or more neighbouring cells 212-2, 222, 232 when the trigger condition is met. For example, when the third signal quality has the trigger condition, e.g. when a difference $\Delta_{SS}$ in signal level between the third signal quality and the first signal quality has passed the trigger condition, the wireless device 240 may perform one or more of: a measurement of total signal strength, a measurement of SINR, or measurements of carrier signal strength. The measurement may be performed on one or more neighbour cells 212-2, 222, 232.

Action 308

Based on the result of the performed measurements for cell reselection, the wireless device 240 may perform or performs cell reselection to the cell providing the best signal quality. For example, based on the result of performed measurement of total signal strength, SINR, or carrier signal strength, the wireless device 240 may perform cell reselection to a most suitable cell, e.g. to a cell having the best total signal strength, the best SINR, or the best carrier signal strength.

Figure 4:
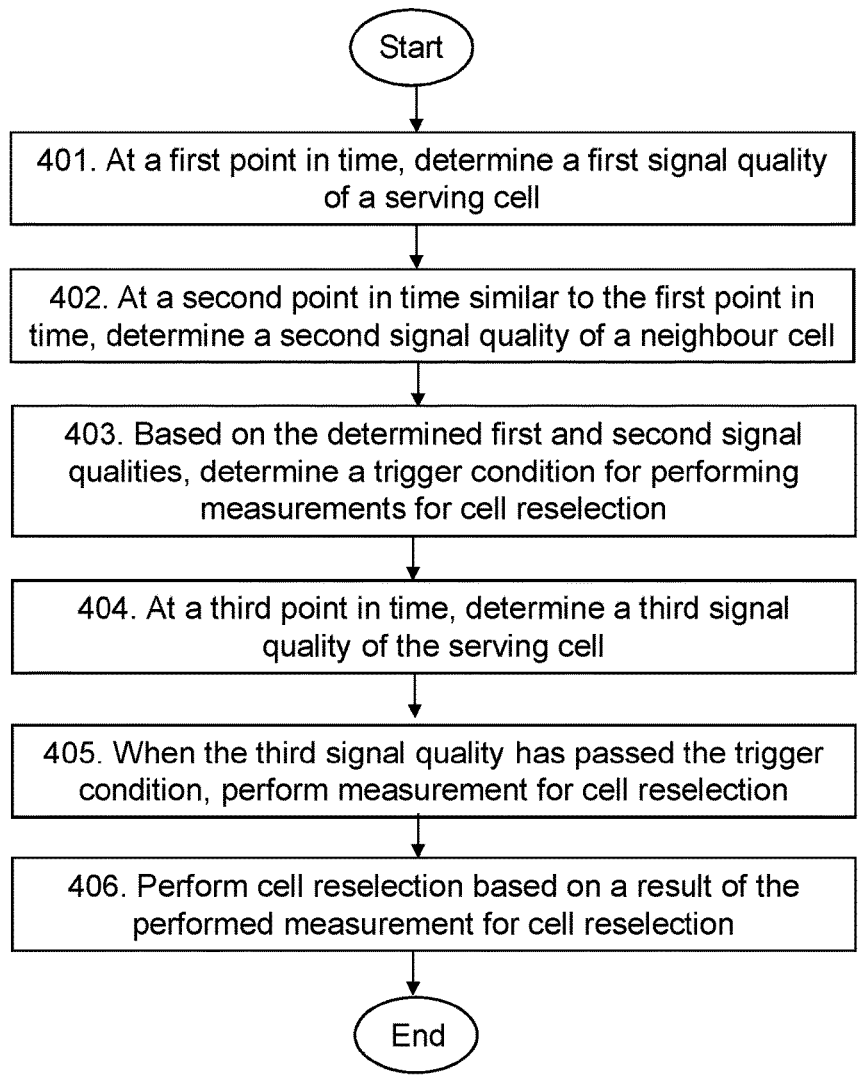
FIG. 4 is a flowchart depicting embodiments of a method performed by a wireless device.

An example of a method performed by the wireless device 240 for providing an improved cell reselection procedure will now be described with reference to a flowchart depicted in FIG. 4. As mentioned above, the wireless device 240 is served, in a first cell 212, e.g. the serving cell 212-1, by the first RNN 210, and the wireless device 240 and the first RNN 210 are operating in the wireless communications network 200.

The methods comprise one or more of the following actions. It should be understood that these actions may be taken in any suitable order and that some actions may be combined.

Action 401

At a first point in time T1, the wireless device 240 determines a first signal quality of the serving cell 212-1. As previously mentioned, the wireless device 240 may determine the first signal quality based on the first signal transmitted from the serving cell 212-1 and received by the wireless device 240. This is done in order to determine the signal quality of the serving cell 212-1.

As previously mentioned, the first signal quality may be a total signal strength, a SINR or a carrier signal strength. The total signal strength may sometimes herein be referred to as useful signal strength or wanted signal strength and it may exclude noise and interference. This relates to Action 302 previously described.

Action 402

In order to be able to compare the first signal quality of the serving cell 212-1 with a signal quality of a neighbour cell 212-2, 222, 232, the wireless device 240 may determine the signal quality of the neighbour cell 212-2, 222, 232. Thus, at a second point in time T2, e.g. at a point in time similar to the first point in time T1, the wireless device 240 determines a second signal quality of a neighbour cell 212-2, 222, 232. In some embodiments, the wireless device 240 determines one or more second signal qualities of one or more neighbouring cells 212-2, 222, 232. As previously mentioned, the wireless device 240 may determine the one or more signal qualities based on one or more second signals transmitted from the one or more neighbouring cells 212-2, 222, 232 and received by the wireless device 240.

In some embodiments, the second signal quality is a second best signal quality after the first signal quality. Further, the second best signal quality may be determined out of the one or more determined second signal qualities of one or more second signals received from one or more neighbour cells 212-2, 222, 232.

In some embodiments, the second signal quality is determined in order to be able to relate the first signal quality of the serving cell 212-1 to the second best cell, e.g. to the best neighbouring cell 212-2, 222, 232, having the second signal quality.

The second signal quality may be a total signal strength, a SINR or a carrier signal strength.

As also previously mentioned the second point in time T2 is equal to or almost equal to the first point in time T1.

This relates to Action 304 previously described.

Action 403

Based on the determined first and second signal qualities, the wireless device 240 determines a trigger condition for performing one or more measurements for cell reselection. For example, this may be done in order to be able to trigger one or more measurements for cell reselection when the signal quality of the serving cell 212-1 deteriorates over time in relation to the signal quality of a strongest neighbour cell.

In some embodiments, the wireless device 240 determines the first trigger condition as a difference $\Delta_{SS}$ between the first and second signal qualities, as a fraction of the difference $\Delta_{SS}$ between the first and second signal qualities, or as a difference $\Delta_{SS}$ between the first and second signal qualities limited by a maximum or a minimum value.

This relates to Action 305 previously described. Further, examples will be described in more detail below.

Action 404

At a third point in time T3, the wireless device 240 determines a third signal quality of the serving cell 212-1. This is done in order to determine whether or not the signal quality of the serving cell 212-1 has changed during the period of time since the determination of the first signal quality at the first point in time T1. For example, this may be the case when the wireless device 240 has been moving between the first point in time T1 and the third point in time T3.

As previously mentioned, the wireless device 240 may determine the third signal quality based on the third signal transmitted from the serving cell 212-1 and received by the wireless device 240.

The third signal quality may be a total signal strength, a SINR or a carrier signal strength.

The third point in time T3 may be different from the first and second points in time T1, T2.

This relates to Action 306 previously described.

Action 405

The wireless device 240 performs one or more measurements for cell reselection when a difference between the third signal quality and the first signal quality has passed the trigger condition. This is done in order to determine the signal quality of one or more neighbouring cells 212-2, 222, 232, when the signal quality of the serving cell 212-1 has been deteriorated. Especially, this is done when the difference between the third and first signal qualities of the serving cell 212-1 has exceeded a trigger condition.

In some embodiments, the wireless device 240 performs the one or more measurements for cell reselection as one or more out of: a measurement of total signals strength, a measurement of SINR, or a measurement of carrier signal strength.

This relates to Action 307 previously described.

Action 406

The wireless device 240 performs cell reselection based on a result of the performed one or more measurements for cell reselection.

This relates to Action 308 previously described. As described in Action 308, based on the result of the performed measurements for cell reselection, the wireless device 240 performs cell reselection to the cell, e.g. one of the neighbouring cell 212-2, 222, 232 providing the best signal quality. For example, based on the result of performed measurement of total signal strength, SINR, or carrier signal strength, the wireless device 240 may perform cell reselection to a most suitable cell, e.g. to a cell having the best total signal strength, the best SINR, or the best carrier signal strength.

Further, based on a best signal quality and a second best signal quality found when performing the one or more measurements for cell reselection, the wireless device 240 may determine a second trigger condition for performing measurements for cell reselection. This may for example be the case when the wireless device 240 has performed a cell reselection to the cell having the best signal quality and thus a new trigger condition should be determined. The second trigger condition may be the same as the first trigger condition or it may be different from the first trigger condition. One or more of the actions described above, may then be repeated in order to determine signal qualities at subsequent points in time and to perform one or measurements for cell reselection when a difference between the signal qualities from the serving cell has passed a trigger condition such as when the difference exceeds a threshold value. This will be described in more detail below with reference to the example of FIG. 6.

Figure 5:
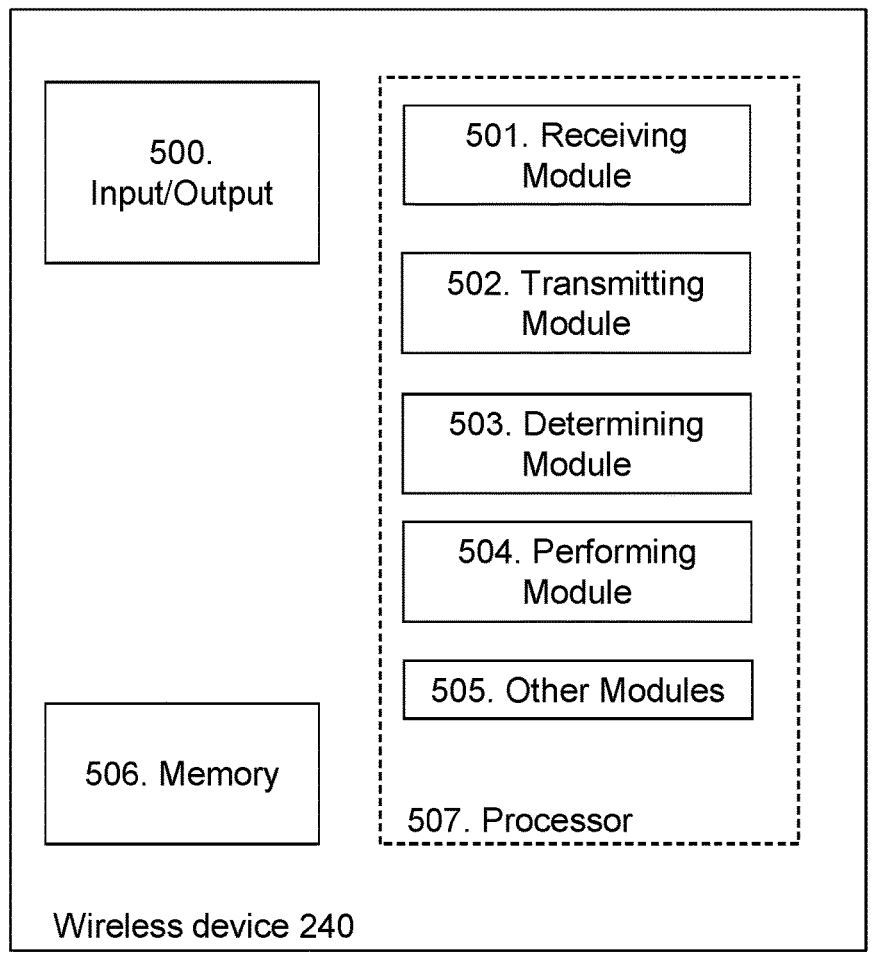
FIG. 5 is a schematic block diagram illustrating embodiments of a wireless device.

To perform the method for the improved cell reselection procedure, the wireless device 240 may be configured according to an arrangement depicted in FIG. 5. As previously described, the wireless device 240 is served, in the first cell 212, by the first RNN 210, and the wireless device 230 and the first RNN 210 are configured to operate in the wireless communications network 200.

In some embodiments, the wireless device 230 comprises an input and/or output interface 500 configured to communicate with one or more wireless devices, one or more radio network nodes, e.g. the RNN 210, 220, 230, and one or more other network nodes, e.g. the core network node 204. The input and/or output interface 500 may comprise a wireless receiver (not shown) and a wireless transmitter (not shown).

The wireless device 240 is configured to receive, by means of a receiving module 501 configured to receive, a transmission, e.g. a signal or information, from a RNN, e.g. from the first, second and/or third RNN 210, 220, 230. The receiving module 501 may be implemented by or arranged in communication with a processor 507 of the wireless device 240. The processor 507 will be described in more detail below.

The wireless device 240 is configured to receive one or more signals from one or more cells served by one or more RNNs. For example, the wireless device 204 may receive a first signal transmitted from a serving cell 212-1. The serving cell 212-1 is served by a serving RNN, e.g. the first RNN 210.

Further, the wireless device 240 may receive a second signal transmitted from a neighbouring cell 212-2, 222, 232. The neighbouring cell 212-2, 222, 232 may be served by the first RNN 210, or by a neighbouring RNN, e.g. the second RNN 220 or the third RNN 230. It should be understood that the neighbouring cell 212-2, 222, 232 is the second first cell 212-2 when served by the first RNN 210, the second cell 222 when served by the second RNN 220, and the third cell 232 when served by the third RNN 230.

Furthermore, it should be understood that the wireless device 240 may receive one or more second signals transmitted from one or more neighbouring cells. The one or more neighbouring cells may be served by the first RNN 210, or by one or more neighbouring RNNs, e.g. the second RNN 220 or the third RNN 230.

Yet further, the wireless device 240 may receive a third signal transmitted from a serving cell 212-1 at a third point in time.

It should be understood that the third signal may be the same signal as the first signal but transmitted at a different point in time, e.g. at the third point in time.

The wireless device 240 is configured to transmit, by means of a transmitting module 502 configured to transmit, a transmission, e.g. a signal or information, to the RNN, e.g. the first, second, or third RNN 210, 220, 230. The transmitting module 502 may be implemented by or arranged in communication with the processor 507 of the wireless device 240.

For example, the wireless device 240 may be configured to transmit a request for cell reselection to the RNN, e.g. the first, second, or third RNN 210,220,230.

However, in for example the EC-GSM-IoT, the cell reselection is an autonomous cell reselection wherein the wireless device 240 decides by itself without telling the communications system or the communications network, e.g. the communications system 200 or the communications network 206, which cell to camp on.

The wireless device 240 is configured to determine, by means of a determining module 503 configured to determine, a signal quality. The determining module 503 may be implemented by or arranged in communication with the processor 507 of the wireless device 240.

As previously mentioned, the wireless device 140 is configured to determine a first signal quality of the serving cell, one or more second signal qualities of one or more neighbouring cells, and a third signal quality of the serving cell. The signal quality may be a signal strength, a SINR, or carrier signal strength just to give some examples. For example, the wireless device 240 may be configured to determine the signal quality by measuring the energy in the total received signal.

Further, the wireless device 240 is configured to determine a trigger condition based on determined first and second signal qualities.

The wireless device 240 may further be configured to perform, by means of a performing module 504 configured to perform, one or more measurements and cell reselection. The performing module 504 may be implemented by or arranged in communication with the processor 506 of the wireless device 240.

The wireless device 240 may be configured to perform one or more measurements for cell reselection. For example, this may be done when the third signal quality of the serving cell 212-1 has passed the trigger condition or based on the first and/or the one or more second signal qualities. For example, the wireless device 240 may be configured to perform one or more of: a measurement of total signal strength, a measurement of SINR, or a measurements of carrier signal strength.

Further, the wireless device 240 may be configured to perform a cell reselection from the serving cell to a neighbouring cell based on a result of the performed measurement for cell reselection.

In some embodiments, the wireless device 240 is configured to perform, by means of one or more other modules 505 configured to perform one or more further actions described herein. The one or more other modules 505 may be implemented by or arranged in communication with the processor 507 of the wireless device 240.

The wireless device 240 may also comprise means for storing data. In some embodiments, the wireless device 240 comprises a memory 506 configured to store the data. The data may be processed or non-processed data and/or information relating thereto. The memory 506 may comprise one or more memory units. Further, the memory 506 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the wireless device 240.

Embodiments herein for improving the cell reselection procedure may be implemented through one or more processors, such as the processor 507 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the wireless device 240. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 240.

Those skilled in the art will also appreciate that the input/output interface 500, the receiving module 501, the transmitting module 502, the determining module 503, the performing module 504, and the one or more other modules 505 above may refer to a combination of analogue and digital circuits, and/or one or more processors configured with software and/or firmware, e.g. stored in the memory 506, that when executed by the one or more processors such as the processors in the wireless device 240 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some Exemplifying Embodiments

Below some exemplifying embodiments will be described. It should be understood that one or more features or actions from one embodiments may be combined with one or more features or actions from one or more other embodiments. In the exemplifying embodiments below, references is made to signal strength. However, it should be understood that signal strength is just an example and that the examples given below are equally applicable to other signal qualities such as a SINR and carrier signal strength just to give two examples.

In some first embodiments, measurements for cell reselection performed by the wireless device 240 is triggered based on the first signal quality such as the signal strength of the camped on cell, e.g. the serving cell 212-1, and based on the second signal quality such as the measured signal strength of one or more neighbour cells 212-2, 222, 232, and how those measurements evolve over time. This relates to Actions 301-308 and 401-406 described above.

The signal strength may be any metric used to rank cells, such as estimation of SINR and/or quality of each cell and/or total signal strength on a specific RF channel.

The evolvement over time may be based on the change from one measurement to the next, or for example relative to the highest or lowest measured value after a pre-determined event, such as a trigger to do measurements for cell reselection.

In some second embodiments, the measurements for cell reselection performed by the wireless device 240 is triggered by the measured signal strength difference between the camped on cell, e.g. the serving cell 212-1, and the strongest neighbour cell, e.g. one of the neighbour cells 212-2, 222, 232. Assume for example that the wireless device 240 has measured the camped on cell, e.g. the serving cell 212-1, to a strength of −80 dBm, and the strongest neighbour cell 212-2, 222, 232 to −90 dBm, measurements for cell reselection will then be triggered by a change in 10 dBm (−80-(−90)) of the camped on cell's signal strength.

In other words, if the third signal quality of the serving cell 212-1 relative the first signal quality is larger than or exceeds 10 dB, the difference between the third signal quality and the first signal quality has passed the trigger condition, and thus the wireless device 240 performs one or more measurements for cell reselection.

In some third embodiments, the measurements for cell reselection performed by the wireless device 240 is triggered by a ratio of the measured signal strength difference between the camped on cell, e.g. the serving cell 212-1, and the strongest neighbour cell 212-2, 222, 232. Thus, the measurements for cell reselection is triggered by a fraction of the difference between the first and second signal qualities. Take the example from some second embodiments but modify the trigger to happen after a change in 0.5 of the signal strength difference, i.e. when the camped on cell's signal strength has by a change in 5 dB ((−80 dBm−(−90 dBm))*0.5) of the camped on cell's signal strength.

In other words, the trigger condition for cell reselection is triggered by the fraction 0.5 of the signal strength difference, e.g. 0.5*10 dB=0.5*(−80 dBm−(−90 dBm)) equal to 5 dB in this example. If the third signal quality of the serving cell 212-1 relative the first signal quality is larger than or exceeds 5 dB, the difference between the third signal quality and the first signal quality has passed the trigger condition, and thus the wireless device 240 performs one or more measurements for cell reselection.

In some fourth embodiments, the measurements for cell reselection performed by the wireless device 240 is subject to a condition that the signal strength need to change by at least a minimum change, and at most a maximum change. In this case the embodiment may be combined with one of the abovementioned embodiments. Take the example from some second embodiments but add a requirement that the change need to be at least 3 dB and at most 8 dB. In this case the trigger will not be determined at 10 dB, but would be limited by the maximum allowed change of 8 dB.

In other words, the trigger condition for cell reselection is equal to 8 dB in this example. If the third signal quality of the serving cell 212-1 relative the first signal quality is larger than or exceeds 8 dB, the difference between the third signal quality and the first signal quality has passed the trigger condition, and thus the wireless device 240 performs one or more measurements for cell reselection.

In some fifth embodiments, the measured signal strength difference triggering cell reselection is made dependent on the absolute signal strength level measured in the camped on cell, e.g. the serving cell 212-1. A first wireless device, e.g. the wireless device 240, experiencing a high absolute signal level may tolerate a higher degradation in experienced signal strength before attempting to re-select to a new cell, than a second wireless device experiencing a low absolute signal level. For example, a first wireless device, e.g. the wireless device 240, just at the edge of its coverage limit needs to trigger cell reselection as soon as the camped on signal strength is degraded, and this regardless of the magnitude of the degradation.

As in some first embodiments described above, assume that the wireless device 240 has measured that the first signal quality of the serving cell 212-1 is −80 dBm, and that the second signal quality of the strongest neighbour cell 212-2, 222, 232 is −90 dBm. Then the trigger condition for cell reselection is 10 dB (−80−(−90)). However, in some fifth embodiments assume that the wireless device 240 has measured that the first signal quality of the serving cell 212-1 is −30 dBm, and that the second signal quality of the strongest neighbour cell 212-2, 222, 232 is −40 dBm. Since the absolute signal level in some fifth embodiments is −30 dBm as compared to −80 dBm in some first embodiments, the trigger condition for cell reselection may also be made dependent on the absolute signal level in order to take it into consideration. For example, for a low absolute signal level, the trigger condition for cell reselection may determine as a fraction of the trigger condition determined for a high absolute signal level. If the third signal quality of the serving cell 212-1 relative the first signal quality is larger than or exceeds this fraction of the trigger condition, the difference between the third signal quality and the first signal quality has passed the trigger condition, and thus the wireless device 240 performs one or more measurements for cell reselection.

In some sixth embodiments, the measured signal strength triggering cell reselection is made dependent on the data size of its next uplink data message in queue. A first wireless device, e.g. the wireless device 240, with a small uplink data message in queue may tolerate lower experienced signal strength before attempting to re-select to a new cell, than a second wireless device with a larger uplink data message in queue. This enables the wireless device to trade off the power consumption for attempting to a transfer its next uplink data message on the current cell and the power consumption for cell-reselection measurements.

As an example, in the current operation the wireless device, e.g. the wireless device 240, is required to confirm its serving cell 212-1 by evaluating how strong the serving cell is, and also evaluate the change in signal strength. Since the wireless device at this point knows it's payload size, it could adopt its threshold to trigger measurements based on the size expected to be transmitted. For a longer expected data transfer the wireless device would more likely like to spend time on the best cell, than if the data transfer is smaller, e.g. less amount of energy being consumed, and the relative energy added from triggering measurements is larger.

As in some first embodiments described above, assume that the wireless device 240 has measured that the first signal quality of the serving cell 212-1 is −80 dBm, and that the second signal quality of the strongest neighbour cell 212-2, 222, 232 is −90 dBm. In some first embodiments, the trigger condition for cell reselection was then determined to be 10 dB (−80−(−90)). However, in some sixth embodiments, the trigger condition is also made dependent on the signal quality and on the size of the data to be transmitted. Thus, if the signal quality is low and the data size large the trigger condition may be lesser than 10 dB, whereas it may be larger than 10 dB if the signal quality is high and the data size small.

If the third signal quality of the serving cell 212-1 relative the first signal quality is larger than or exceeds the trigger condition, the difference between the third signal quality and the first signal quality has passed the trigger condition, and thus the wireless device 240 performs one or more measurements for cell reselection.

In some seventh embodiments the measured signal strength difference triggering cell reselection is made dependent on the data size of its next uplink data message in queue. A first wireless device, e.g. the wireless device 240, with a small uplink data message in queue may tolerate higher degradation in experienced signal strength before attempting to re-select to a new cell, than a second wireless device with a larger uplink data message in queue. This enables the wireless device to trade off the power consumption for attempting to a transfer its next uplink data message on the current cell and the power consumption for cell-reselection measurements.

In other words, the trigger condition for cell reselection is in some seventh embodiments made dependent on the size of the data to be transmitted. This is in contrast to some sixth embodiments wherein the trigger condition also was made dependent on the signal quality. Thus, in some seventh embodiments, when data of a larger size is to be transmitted the trigger condition may be set smaller than the trigger condition when data of a smaller size is to be transmitted.

If the third signal quality of the serving cell 212-1 relative the first signal quality is larger than or exceeds the trigger condition, the difference between the third signal quality and the first signal quality has passed the trigger condition, and thus the wireless device 240 performs one or more measurements for cell reselection.

In some eighth embodiments, one or more of the above mentioned embodiments are combined to form a set of conditions to trigger measurements for cell reselection.

The conditions to trigger measurements, such as the mentioned limits for minimum and maximum change, for cell reselection mentioned above may be signalled by the serving RNN, e.g. the first RNN 210, to the wireless device 240 in for example the System Information or the conditions to trigger measurements may be pre-defined in the standard.

Figure 6:
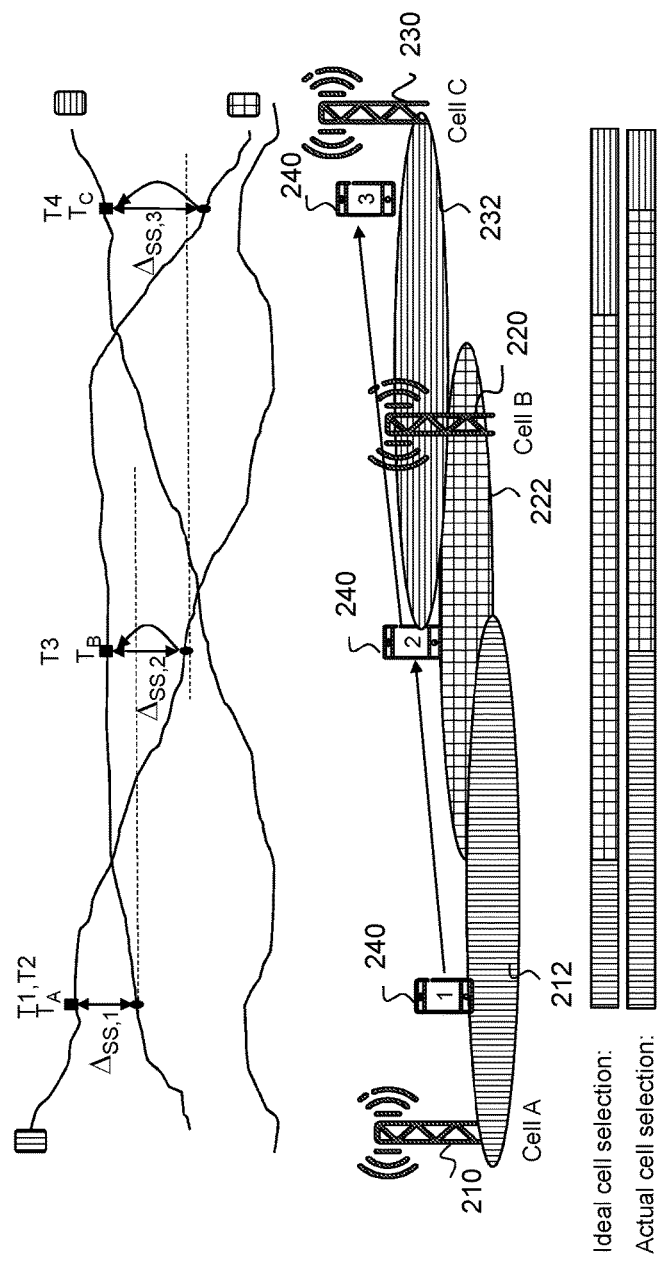
FIG. 6 is a schematic block diagram schematically illustrating cell reselection according to some embodiments.

FIG. 6 is a schematic block diagram schematically illustrating cell reselection according to some embodiments.

As schematically illustrated in FIG. 6, the wireless device 240 performs measurements at a first point in time T1, and at a second point in time T2 similar to the first point in time. The result is that cell A, e.g. the first cell 212, is the strongest cell and hence the wireless device 240 camps on that cell. In this example, the first cell 212 is the serving cell. The signal strength for other cells, e.g. other neighbouring cells 222, 232, are also measured and it is found that cell B, e.g. the neighbouring cell 222, is the second strongest cell. A first difference between the two cells $\Delta_{SS,1}$, e.g. a difference in signal strengths between the serving cell 212 and the strongest neighbouring cell 222, are stored in the wireless device 240 as a trigger, e.g. a first trigger condition, for cell reselection measurements. This relates to Actions 302, 304, 305, 401, 402 and 403 previously described.

The wireless device 240 wakes up at a third point in time T3. As previously mentioned the third point in time T3 is sometimes herein referred to as a second point in time $T_B$. The wireless device 240 tries to confirm that the previously camped cell, e.g. the first cell 212, is still strong enough, but fails to confirm this since the relative change in signal strength $\Delta_{SS,2}$ is more than the stored allowed change $\Delta_{SS,1}$, e.g. the first trigger condition has been passed. In other words, the first cell 212, e.g. the serving cell, fails to confirm that it is strong enough since the relative change in signal strength $\Delta_{SS,2}$ between a third signal transmitted from the first cell at the third point in time and the first signal is exceeds the stored allowed change $\Delta_{SS,1}$. This may also be expressed as the difference between the third signal quality and the first signal quality has passed the first trigger condition. Therefore, one or more measurements for cell reselection are triggered. This relates to Actions 306, 307 and 404, 405 previously described. It is found that cell B, e.g. the second cell 222, is the strongest cell and hence the wireless device 240 camps on that cell, i.e. the wireless device 240 performs a reselection to the second cell 222. The signal strength for other cells 212, 232 are also measured and it is found that cell A, e.g. the first cell 212, is now the second strongest cell. A second difference between the two cells, e.g. the second cell 222 and the first cell 212, $\Delta_{SS,2}$, e.g. a second trigger condition, is stored in the wireless device 240 as a trigger for cell reselection measurements. The second difference $\Delta_{SS,2}$ does not need to be the same as the first difference $\Delta_{SS,1}$ but the first and second differences could be the same. In other words, the first and second trigger conditions may be different.

The wireless device 240 wakes up at fourth point in time T4. The fourth point in time T4 may sometimes herein be referred to as a third point in time $T_C$. It tries to confirm that the previously camped cell, e.g. the second cell 222, is still strong enough, but fails to confirm this since the relative change in signal strength is more than the stored allowed change $\Delta_{SS,2}$, e.g. the stored second trigger condition. In other words, the second cell 222, e.g. the serving cell, fails to confirm that it is strong enough since the relative change in signal strength $\Delta_{SS,3}$ is exceeds the stored allowed change $\Delta_{SS,2}$. This may also be expressed as the difference between two signal strengths from the second cell 222 at a respective point in time, e.g. the third and fourth points in time T3, T4, has passed the first trigger condition. Therefore, one or more measurements for cell reselection are triggered. It is found that cell C, e.g. the third cell 232, is the strongest cell and hence the wireless device 240 camps on that cell, i.e. the wireless device 240 performs a reselection to the third cell 232. The signal strength for other cells 212, 222 are also measured and it is found that cell B is now the second strongest cell. A third difference between the two cells, e.g. the third cell 232 and the second cell 222, $\Delta_{SS,3}$ e.g. a third trigger condition, is stored in the wireless device 240 as a trigger for further cell reselection measurements. The third difference $\Delta_{SS,3}$ does not need to be the same as the first difference $\Delta_{SS,1}$ or the second difference $\Delta_{SS,2}$ but it could be the same as one or both of them. In other words, the first, second and third trigger conditions may be different or one or more of them may be the same.

Although an ideal cell reselection procedure would require too frequent measurements to be made, embodiments herein provides an improved cell reselection procedure wherein the right, e.g. the optimal, cell is selected at the points in time where measurements are triggered and the wireless device 240 selects all cells it moves around when it moves in the communications network, e.g. the communications network 200.

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a wireless device for providing an improved cell reselection procedure, wherein the wireless device is served in a serving cell by a first Radio Network Node (RNN), wherein the wireless device and the first RNN are operating in a wireless communications network, and wherein the method comprises:
   at a first point in time, determining a first signal quality of a first signal received from the serving cell;
   at a second point in time, determining a second signal quality of a second signal received from a neighbor cell;
   based on a difference between the first signal quality and the second signal quality, determining a first trigger condition for performing measurements for cell reselection;
   at a third point in time, determining a third signal quality of a third signal received from the serving cell; and
   when a difference between the third signal quality and the first signal quality has passed the first trigger condition, performing one or more measurements for cell reselection.

2. The method of claim 1, further comprising:
   based on a result of the one or more measurements performed for cell reselection, performing cell reselection to one out of one or more neighbor cells.

3. The method of claim 1, wherein the second signal quality is a second best signal quality after the first signal quality, and wherein the second best signal quality is determined out of one or more determined second signal qualities of one or more second signals received from one or more neighbor cells.

4. The method of claim 1, wherein determining the first trigger condition for performing measurements for cell reselection comprises:
   determining the first trigger condition as one of: a fraction of the difference between the first and second signal qualities; and a difference between the first and second signal qualities limited by a maximum or a minimum value.

5. The method of claim 1, wherein performing the one or more measurements for cell reselection comprises:
   performing one or more out of: a measurement of total signal strength, a measurement of Signal-to-Interference-plus-Noise Ratio (SINR), and a measurement of carrier signal strength.

6. The method of claim 5, further comprising:
   based on a result of the one or more measurements performed for cell reselection,
   performing cell reselection to one out of one or more neighbor cells, wherein performing the cell reselection based on the result comprises:
    performing the cell reselection to a neighbor cell having the highest measured total signal strength, the highest measured SINR, or the highest measured carrier signal strength, out of the neighbor cells.

7. The method of claim 1, wherein each of the first signal quality, the second signal quality and the third signal quality is one of: a total signal strength, a Signal-to-Interference-plus-Noise Ratio (SINR), and a carrier signal strength.

8. The method of claim 1, wherein the first and second points in time are equal or almost equal points in time.

9. The method of claim 1, wherein the third point in time is different from the first and second points in time.

10. The method of claim 1, further comprising:
    based on a best signal quality and a second best signal quality found when performing the one or more measurements for cell reselection, determining a second trigger condition for performing measurements for cell reselection, wherein the second trigger condition is one out of:
        same as the first trigger condition; and
        different from the first trigger condition.

11. The method of claim 1, wherein the first and third signals are the same signal transmitted on a broadcast channel at the first point in time and the third point in time, respectively.

12. A wireless device configured to provide an improved cell reselection procedure, wherein the wireless device is configured to be served in a serving cell by a first Radio Network Node (RNN), wherein the wireless device and the first RNN are configured to operate in a wireless communications network, and wherein the wireless device comprises:
    transceiver circuitry configured for receiving signals from the serving cell and one or more neighbor cells; and
    processing circuitry operatively associated with the transceiver circuitry and configured to:
        at a first point in time, determine a first signal quality of a first signal received from the serving cell;
        at a second point in time, determine a second signal quality of a second signal received from a neighbor cell;
        based on a difference between the first signal quality and the second signal quality, determine a first trigger condition for performing measurements for cell reselection;
        at a third point in time, determine a third signal quality of a third signal received from the serving cell; and
        perform one or more measurements for cell reselection when a difference between the third signal quality and the first signal quality has passed the first trigger condition.

13. The wireless device of claim 12, wherein the processing circuitry is configured to:
    perform cell reselection to one out of one or more neighbor cells based on a result of the one or more measurements performed for cell reselection.

14. The wireless device of claim 12, wherein the second signal quality is a second best signal quality after the first signal quality, and wherein the second best signal quality is determined out of one or more determined second signal qualities of one or more second signals received from one or more neighbor cells.

15. The wireless device of claim 12, wherein the processing circuitry is configured to determine the first trigger condition for performing measurements for cell reselection by:
    determining the first trigger condition as one of: a fraction of the difference between the first and second signal qualities; and a difference between the first and second signal qualities limited by a maximum or a minimum value.

16. The wireless device of claim 12, wherein the processing circuitry is configured to perform the one or more measurements for cell reselection by:
    performing one or more out of: a measurement of total signal strength, a measurement of Signal-to-Interference-plus-Noise Ratio (SINR), and a measurement of carrier signal strength.

17. The wireless device of claim 16, wherein the processing circuitry is configured to perform cell reselection based on a result of the one or more measurements performed for cell reselection by:
    performing the cell reselection to a neighbor cell having the highest measured total signal strength, the highest measured SINR, or the highest measured carrier signal strength, out of the neighbor cells.

18. The wireless device of claim 12, wherein each of the first signal quality, the second signal quality and the third signal quality is one of: a total signal strength, a Signal-to-Interference-plus-Noise Ratio (SINR), and a carrier signal strength.

19. The wireless device of claim 12, wherein the first and second points in time are equal or almost equal points in time.

20. The wireless device of claim 12, wherein the third point in time is different from the first and second points in time.

21. The wireless device of claim 12, wherein the processing circuitry is configured to:
    determine a second trigger condition for performing measurements for cell reselection based on a best signal quality and a second best signal quality found when performing the one or more measurements for cell reselection, wherein the second trigger condition is one out of:
        same as the first trigger condition; and
        different from the first trigger condition.

22. The wireless device of claim 12, wherein the first and third signals are the same signal transmitted on a broadcast channel at the first point in time and the third point in time, respectively.

23. A non-transitory computer readable storage medium storing a computer program for providing an improved cell reselection procedure, wherein a wireless device is served in a serving cell by a first Radio Network Node (RNN), and wherein the wireless device and the first RNN are operating in a wireless communications network, the computer program comprising instructions that, when executed on at least one processor of the wireless device, causes the at least one processor to:
    at a first point in time, determine a first signal quality of a first signal received from the serving cell;
    at a second point in time, determine a second signal quality of a second signal received from a neighbor cell;
    based on a difference between the first signal quality and the second signal quality, determine a first trigger condition for performing measurements for cell reselection;

at a third point in time, determine a third signal quality of a third signal received from the serving cell; and when a difference between the third signal quality and the first signal quality has passed the first trigger condition, perform one or more measurements for cell reselection.

* * * * *

UNITED STATES PATENT AND TRADEMARK OFFICE
CERTIFICATE OF CORRECTION

PATENT NO. : 10,149,222 B2
APPLICATION NO. : 15/572533
DATED : December 4, 2018
INVENTOR(S) : Sundberg et al.

Page 1 of 2

It is certified that error appears in the above-identified patent and that said Letters Patent is hereby corrected as shown below:

On the Title Page

In Item (57), under "ABSTRACT", in Column 2, Line 1, delete "wireless device 204" and insert -- wireless device 240 --, therefor.

In the Specification

In Column 5, Line 29, delete "network." and insert -- network; --, therefor.

In Column 7, Line 26, delete "Equipped (LEE)," and insert -- Equipment (LEE), --, therefor.

In Column 8, Line 8, delete "(GPRS) Node" and insert -- (GPRS) Support Node --, therefor.

In Column 10, Line 32, delete "T1=T2 or T1=T2." and insert -- T1=T2 or T1≈T2. --, therefor.

In Column 10, Lines 55-56, delete "a an NB-IoT" and insert -- an NB-IoT --, therefor.

In Column 13, Line 42, delete "wireless device 230" and insert -- wireless device 240 --, therefor.

In Column 13, Line 45, delete "wireless device 230" and insert -- wireless device 240 --, therefor.

In Column 13, Line 62, delete "wireless device 204" and insert -- wireless device 240 --, therefor.

In Column 14, Line 41, delete "wireless device 140" and insert -- wireless device 240 --, therefor.

In Column 14, Line 57, delete "processor 506" and insert -- processor 507 --, therefor.

In Column 17, Line 56, delete "it's payload" and insert -- its payload --, therefor.

In Column 19, Lines 12-13, delete "is exceeds" and insert -- exceeds --, therefor.

Signed and Sealed this
Twenty-sixth Day of March, 2019

Andrei Iancu
*Director of the United States Patent and Trademark Office*

In Column 19, Line 43, delete "is exceeds" and insert -- exceeds --, therefor.

In Column 19, Line 55, delete "$\Delta_{SS,3}$" and insert -- $\Delta_{SS,3}$ --, therefor.